United States Patent [19]
Amano et al.

[11] Patent Number: 5,142,004
[45] Date of Patent: Aug. 25, 1992

[54] METHOD OF PRODUCING VINYL CHLORIDE RESIN HAVING HIGH PLASTICIZER ABSORPTION AND LOW DEFECT CONTENT BY SUSPENSION POLYMERIZATION

[75] Inventors: Tadashi Amano, Kanagawa, Japan; Shigehiro Hoshida, Freeport, Tex.

[73] Assignee: Shin-Etsu Chemical Co., Ltd., Tokyo, Japan

[21] Appl. No.: 627,269

[22] Filed: Dec. 14, 1990

[30] Foreign Application Priority Data

Dec. 19, 1989 [JP] Japan .................................. 1-329051

[51] Int. Cl.⁵ .............................................. C08F 2/20
[52] U.S. Cl. ...................................... 526/88; 526/202
[58] Field of Search .................. 526/88, 199, 200, 202

[56] References Cited
U.S. PATENT DOCUMENTS 4,957,983  9/1990  Hawrylko ........................... 526/200

*Primary Examiner*—Christopher Henderson
*Attorney, Agent, or Firm*—McAulay, Fisher, Nissen, Goldberg & Kiel

[57] ABSTRACT

The invention provides an improved method for the suspension polymerization of vinyl chloride to give a polyvinyl chloride resin having excellent properties such as high bulk density, small number of fish-eyes, rapid plasticizer absorption and easy monomer releasability with a decreased amount of polymer scale deposition on the reactor walls. The inventive method characteristically comprises the successive steps of: introducing water as the suspension medium at an elevated temperature of 40° C. or higher, introducing the monomer under agitation to be dispersed into monomer droplets, introducing a partially saponified polyvinyl alcohol, which satisfies several specific physical and chemical requirements, in the form of an aqueous solution and, within 3 minutes thereafter, introducing a monomer-dsoluble polymerization initiator. By this means, the undesirable adsorption of the suspending agent on to the surface of the monomer droplets can be minimized so as to exhibit the suspending effect with a small amount of the suspending agent without being adsorbed on the monomer droplets.

7 Claims, No Drawings

METHOD OF PRODUCING VINYL CHLORIDE RESIN HAVING HIGH PLASTICIZER ABSORPTION AND LOW DEFECT CONTENT BY SUSPENSION POLYMERIZATION

BACKGROUND OF THE INVENTION

The present invention relates to a method for the suspension polymerization of vinyl chloride monomer. More particularly, the invention relates to a method for the suspension polymerization of vinyl chloride monomer capable of providing a vinyl chloride resin having advantageous properties such as high plasticizer absorption and small content of fish-eyes with a decreased amount of polymer scale deposition on the reactor walls.

Vinyl chloride polymers are heretofore produced mostly by the method of so-called suspension polymerization of vinyl chloride monomer or a monomer mixture mainly composed of vinyl chloride in combination with a minor amount of other ethylenically unsaturated monomers in an aqueous suspension medium containing a dispersing or suspending agent, such as polyvinyl alcohol, hereinafter referred to as PVA, water-soluble cellulose derivatives and the like, of which PVAs are the most conventional and widely used.

The conventional procedure for the suspension polymerization of vinyl chloride is as follows. Thus, water as the suspension medium and a PVA, usually in the form of an aqueous solution, are first introduced into the polymerization reactor and, after evacuation to exclude the atmospheric air from the reactor, the monomer or monomer mixture is introduced into the reactor under agitation and, when a uniform dispersion of the monomer droplets in the aqueous medium has been established, a polymerization initiator, which is usually soluble in the monomer phase, is added to the polymerization mixture in the reactor to start the polymerization reaction. A problem in this conventional procedure is that, because of the relatively lengthy contacting time of the vinyl chloride monomer droplets and the PVA as the suspending agent before start of the polymerization reaction, a considerable portion of the PVA is adsorbed on the monomer droplets resulting in a decrease in the effective concentration of the suspending agent in the aqueous medium so as to decrease the stability of the monomer suspension.

As a consequence, the polyvinyl chloride resin obtained by this conventional procedure has several problems in the properties such as broad particle size distribution and low porosity responsible for the slow rate of plasticizer absorption to decrease the productivity in the molding processes and retarded gelation to cause non-uniform quality of the molded articles. The number of fish-eyes is also considerably large to result in poor outer appearance of the molded articles. Apart from the quality of the molded articles of the resin powder, the low porosity of the resin particles is an unfavorable condition for the removal of the unreacted monomer adsorbed in the resin particles from which the monomer vapor is subsequently emitted in the course of the resin processing and molding process to cause pollution of the working environments with a serious problem against the workers' health. When the molded articles of the polyvinyl chloride resin contain the unreacted vinyl chloride monomer, there may be caused a serious problem on the public health.

In view of the above described situations, solutions for the problems are sought by attempting use of various types of PVAs to be used as the suspending agent. For example, so-called oil-soluble PVAs having a low degree of polymerization and low degree of saponification as well as modified PVAs having various kinds of substituent groups have been proposed as a suspending agent. The oil-soluble PVAs as the suspending agent have a disadvantage that the bulk density of the resin powder produced therewith can not always be high enough although they are effective in improving the resin powder in respect of the releasability of the unreacted monomer and decrease in the number of fish-eyes. Modified PVAs having various substituent groups are disadvantageous in respect of the stability of the monomer suspension in the aqueous medium resulting in a relatively large amount of polymer scale deposition on the reactor walls and broadness of the particle size distribution of the resin powder.

SUMMARY OF THE INVENTION

The present invention accordingly has an object to provide a method for the suspension polymerization of vinyl chloride monomer or a monomer mixture mainly composed of vinyl chloroide capable of giving a polyvinyl chloride resin product having a high bulk density exhibiting good monomer releasability and plasticizer absorption and containing a greatly decreased number of fish-eyes without increasing the amount of polymer scale deposition on the reactor walls.

The method of the present invention for the suspension polymerization of vinyl chloride monomer or a monomer mixture mainly composed of vinyl chloride in an aqueous medium comprises the successive steps of:

(a) introducing water to serve as the suspension medium into a polymerization reactor;

(b) keeping the water in the polymerization reactor at a temperature of 40° C. or higher;

(c) removing the air inside the polymerization reactor;

(d) introducing the monomer or monomer mixture into the polymerization reactor under agitation to disperse the monomer or monomer mixture in the aqueous medium;

(e) introducing a polyvinyl alcohol as the suspending agent in the form of an aqueous solution or dispersion into the dispersion of the monomer or monomer mixture under agitation; and (f) introducing a monomer-soluble polymerization initiator into the dispersion of the monomer or monomer mixture under agitation at a moment within 3 minutes from the introduction of the polyvinyl alcohol to start the polymerization reaction.

DETAILED DESCRIPTION OF THE PREFERRED EMBODIMENTS

The inventors have undertaken extensive studies with an object ro solve the above-mentioned problems on the manner for introducing the respective ingredients of the polymerization mixture into the polymerization reactor and starting of the polymerization reaction in the suspension polymerization of vinyl chloride monomer or a monomer mixture mainly composed of vinyl chloride in an aqueous medium and, as a consequence, have arrived at a discovery that the quality of the resin powder obtained by the polymerization as well as the amount of polymer scale deposition on the reactor walls are greatly influenced by the temperature of water as the suspension medium and the contacting time of the PVA as the suspending agent and the monomer droplets under agitation before the polymerization reaction is started by introducing a polymerization initiator into the polymerization mixture.

Thus, the essential feature of the inventive method for the suspension polymerization of vinyl chloride monomer consists in the sequential order of the above described steps (a) to (f) which is not undertaken in the conventional processes for the production of polyvinyl chloride resins.

In step (a) of the inventive method, water is introduced into the polymerizaztion reactor and, in step (b), the water in the polymerization reactor is kept at a temperature of 40° C. or higher. It is optional that the water introduced into the reactor is at a temperature lower than 40° C. and then heated in the reactor up to the specified temperature or water preheated to 40° C. or higher is introduced into the reactor. A temperature of water in the reactor prior to step (c) lower than 40° C. is not preferred because of the broadened particle size distribution and the low bulk density of the polyvinyl chloride resin produced thereby. A temperature of water exceeding 50° C. is also not preferred because of a possible increase in the number of fish-eyes.

The amount of water introduced into the polymerization reactor as the polymerization medium is in the range from 100 to 200 parts by weight per 100 parts by weight of the vinyl chloride monomer or a monomer mixture mainly composed of vinyl chloride. After charging of the reactor with water which is kept at a specified temperature, the air inside the reactor is removed in step (c) by evacuation according to a known prodecure.

Thereafter in steps (d) and (e), vinyl chloride monomer or a monomer mixture mainly composed of vinyl chloride and then a PVA as a suspending agent usually in the form of an aqueous solution or dispersion are introduced into the aqueous polymerization medium which is under agitation. The condition of agitation is of some significance and it is preferable that the power consumption for agitation is in the range from 0.8 to 2.0 kilowatts per cubic meter of the polymerization mixture.

The PVA as the suspending agent used here is a PVA obtained by the partial saponification of polyvinyl acetate and should have a degree of saponification in the range from 60 to 80% by moles and an average degree of polymerization in the range from 500 to 1000 to give a 4% by weight aqueous solution having a viscosity not exceeding 15 centipoise at 20° C. Specifically in the inventive method, the PVA should preferably give a 1% by weight aqueous solution of which the absorbance of light at a wavelength of 280 nm is at least 4 as measured in a measuring cell of 1 cm optical path length. This requirement is particularly important in order to give a polyvinyl chloride resin having an increased bulk density. The amount of the PVA added as a suspending agent is in the range from 0.02 to 0.08 part by weight per 100 parts by weight of the monomer or monomer mixture. When the amount thereof is too small, no sufficient stability of the monomer suspension can be obtained as a matter of course. When the amount thereof is too large, on the other hand, the bulk density of the product resin powder may eventually be rather decreased.

It is optional according to need that the above specified PVA as the suspending agent can be used in combination with other dispersing agents known in the art. Examples of such an auxiliary dispersing agent include polyvinyl alcohols not satisfying the above mentioned requirements for the particular partially saponified PVA, water-soluble cellulose ethers such as methyl cellulose, ethyl cellulose, hydroxyethyl cellulose, hydroxypropyl cellulose, hydroxypropyl methyl cellulose and the like, water-soluble polymers such as poly(acrylic acid), gelatin and the like, oil-soluble emulsifying agents such as sorbitan monolaurate, sorbitan trioleate, sorbitan monostearate, glycerin tristearate, ethyleneoxidepropyleneoxide block copolymers and the like, water-soluble emulsifying agents such as polyoxyethylene sorbitan monolaurate, polyoxyethylene glycerin oleate, sodium laurate and the like, calcium carbonate, calcium phosphate, sodium dodecylbenzene sulfonate and so on which can be used either alone or as a combination of two kinds or more. When used, the amount of these auxiliary dispersing agents should not exceed 0.15 part by weight per 100 parts by weight of the monomer or monomer mixture as a total with the above specified particular partially saponified PVA.

In step (f) of the inventive method, a monomer-soluble polymerization initiator is introduced into the polymerization mixture in the reactor. It is essential here that introduction of the polymerization initiator is completed within 3 minutes from the introduction of the specific PVA as the suspending agent in step (e). This means that the polymerization reaction in the monomer droplets should be started as soon as the stabilized state of the monomer droplet dispersion has been established without unduly long contacting time of the monomer droplets and the PVA as the suspending agent. Preferably, the polymerization initiator is introduced into the reactor at a moment from 30 seconds to 3 minutes after introduction of the suspending agent.

The reason for the above mentioned requirement is presumably as follows. Namely, the specific PVA and the vinyl chloride monomer have strong affinity with each other so that, when the contacting time therebetween before start of the polymerization reaction is unduly extended, a substantial portion of the PVA is adsorbed on the monomer droplets to cause a decrease in the effective concentration of the suspending agent in the aqueous polymerization medium so that no sufficient activity as a protective colloid can be exhibited by the PVA resulting in a coarser particle size distribution and a decreased bulk density of the resin particles obtained by the polymerization reaction if not to mention the adverse influence to cause an increase in the polymer scale deposition on the reactor walls.

The amount of the monomer-soluble polymerization initiator added to the polymerization mixture is usually in the range from 0.03 to 0.20 part by weight per 100 parts by weight of the monomer or monomer mixture. It is usual that the monomer-soluble polymerization initiator is introduced into the reactor in the form of a solution in an organic solvent or in the form of an aqueous emulsion by using a pressurizing pump to facilitate rapid and uniform take-up into the monomer droplets.

Any of known monomer-soluble polymerization initiators used in the suspension polymerization of vinyl chloride monomer can be used in the inventive method. Particular examples of such a polymerization initiator include percarbonate compounds such as diisopropylperoxy dicarbonate, di-2-ethylhexylperoxy carbonate, diethoxyethylperoxy dicarbonate and the like, perester compounds such as tert-butylperoxy neodecanoate, tert-butylperoxy pivalate, tert-hexylperoxy pivalate, α-cumylperoxy neodecanoate, 2,4,4-trimethylpentyl-2-neodecanoate and the like, peroxides such as acetyl cyclohexyl sulfonyl peroxide, 2,4,4-trimethylpentyl-2-peroxy phenoxy acetate, 3,5,5-trimethyl hexanoyl peroxide, lauroyl peroxide and the like, azo compounds such as azobis-2,4-dimethyl valeronitrile, azobis(4-methoxy-2,4-dimethyl valeronitrile) and the like. Furthermore, certain water-soluble polymerization initiators such as potassium persulfate, ammonium persulfate, hydrogen peroxide, cumene hydroperoxide and the like can be used in combination with the above named monomer-soluble initiators according to need.

The inventive method is applicable not only to the suspension polymerization of vinyl chloride monomer alone in an aqueous medium but also to the suspension copolymerization of vinyl chloride monomer in combination with a minor amount, e.g., 50% by weight or smaller in the monomer mixture, of one or more of other ethylenically unsaturated monomers copolymerizable with vinyl chloride. The comonomer copolymerizable with vinyl chloride is exemplified by vinyl esters such as vinyl acetate, vinyl propionate and the like, or acrylic or methacrylic acid esters such as methyl acrylate, ethyl acrylate, methyl methacrylate and the like, olefins such as ethylene, propylene and the like, vinyl ethers such as lauryl vinyl ether, isobutyl vinyl ether and the like, maleic anhydride, acrylonitrile, styrene, vinylidene chloride and others.

Besides the above described particular requirements, other conditions for the polymerization according to the inventive method can be conventional. It is of course optional that various kinds of known auxiliary additives conventionally used in the suspension polymerization of vinyl chloride are added to the polymerization mixture according to need including polymerization-controlling agents, chain transfer agents, pH-controlling agents, gelation improvers, antistatic agents, crosslinking agents, stabilizers, fillers, antioxidants, buffering agents, scale-inhibiting agents and the like.

In the following, examples and comparative examples are given to illustrate the inventive method in more detail but not to limit the scope of the invention in any way. In the following examples and comparative examples, the properties of the resin product were evaluated by the following testing procedures.

Bulk Density

The bulk density of the resin powder was measured according to the procedure specified in JIS K 6721.

Particle Size Distribution

The resin powder was screened by using a set of screens having mesh openings of 60 meshes, 100 meshes and 200 meshes according to the procedure specified in JIS K 8801 and the fraction in % of the resin powder passed through each of the screens was recorded as a measure of the particle size distribution.

Dioctyl Phthalate (DOP) Absorption

A 10 g portion of the resin powder was put on a glass fiber mat spread over the bottom of a cylindrical vessel of an aluminum alloy having an inner diameter of 25 mm and a depth of 85 mm and then 15 ml of DOP were poured thereinto. After standing as such at 25° C. for 30 minutes to have the DOP absorbed in the resin powder, the resin powder was freed from the unabsorbed free DOP by centrifugation under an acceleration of 1500 G and weighed to determine the amount of the DOP absorbed in the resin powder. The result was recorded in % by weight based on the amount of the dry resin powder.

Number of Fish-Eyes

A mixture composed of 100 parts by weight of the resin powder, 50 parts by weight of DOP, 0.1 part by weight of barium stearate, 0.1 part by weight of cadmium stearate, 0.8 part by weight of cetyl alcohol, 2.0 parts by weight of a tin-containing stabilizer, 0.5 part by weight of titanium dioxide and 0.1 part by weight of carbon black was milled for 5 minutes on a 6-inch mixing roller at 140° C. and then sheeted into a sheet having a thickness of 0.3 mm. The number of translucent spots in the thus prepared sheet was counted for 100 $cm^2$ area and recorded as the number of fish-eyes.

Residual Monomer Content

A specified amount of the resin powder was dissolved in a volume of tetrahydrofuran and the content of the unreacted vinyl chloride monomer in the solution was determined by the gas chromatography and recorded in ppm by weight based on the amount of the dry resin powder.

Scale Deposition on Reactor Walls

The reactor walls after discharge of the polymerizate slurry were visually examined for the condition of polymer scale deposition, which was recorded in three ratings A, B and C according to the following criteria.

A: mirror-like metallic luster of the wall surface retained absolutely without polymer scale deposition
B: noticeable dullness in the metallic luster of the surface
C: polymer scale found all over the wall surface

EXAMPLE 1

Experiment No. 1

Into a stainless steel-made polymerization reactor of 2.1 $m^3$ capacity were introduced 900 kg of deionized water at 46° C. as the suspension medium and the air inside the reactor was removed by evacuation down to a pressure of 60 mmHg. Thereafter, 600 kg of vinyl chloride monomer were introduced into the reactor while the aqueous medium was under agitation with a stirrer rotating at a velocity of 220 rpm with an electric power of 1.0 kilowatt per cubic meter of the polymerization mixture and then 600 g of a 30 % by weight aqueous solution of a partially saponified PVA were introduced into the reactor. The partially saponified PVA had a degree of saponification of 72.4% by moles and an average degree of polymerization of 770 with a viscosity of a 4% aqueous solution of 5.7 centipoise at 20° C. A 1% by weight aqueous solution thereof had an absorbance of 6.5 at a wavelength of 280 nm for a 1 cm optical path length.

After lapse of 2 minutes from the introduction of the PVA solution, 630 g of an aqueous emulsion containing 40% by weight of di-2-ethylhexylperoxy dicarbonate were introduced into the reactor to start the polymerization reaction along with heating of the polymerization mixture up to 57° C. The polymerization reaction was continued at this temperature until the pressure inside the reactor had dropped to 6.0 $kg/cm^2$ G followed by purging of the unreacted vinyl chloride monomer and discharging of the polyvinyl chloride resin in the form of an aqueous slurry out of the reactor. The polymerizate slurry was processed according to a conventional procedure into a dry resin powder which was subjected to the evaluation tests to give the results shown in the table given below.

EXAMPLE 2

Experimental No. 2

The experimental procedure was substantially the same as in Example 1 except that the amount of the 30% by weight aqueous solution of the partially saponified PVA was increased to 800 g instead of 600 g. The results of the evaluation tests undertaken for the resin product thus obtained are shown in the table.

EXAMPLE 3

Experiment No. 3

The experimental procedure was substantially the same as in Example 1 except that the polymerization initiator in the form of an aqueous emulsion was introduced into the reactor concurrently with introduction of the 30% by weight aqueous solution of the partially saponified PVA. The results of the evaluation tests undertaken for the resin product thus obtained are shown in the table.

COMPARATIVE EXAMPLE 1

Experiment No. 4

The experimental procedure was substantially the same as in Example 1 except that the polymerization initiator in the form of an aqueous emulsion was introduced into the reactor after lapse of 5 minutes from the introduction of the 30% by weight aqueous solution of the partially saponified PVA. The results of the evaluation tests undertaken for the resin product thus obtained are shown in the table.

COMPARATIVE EXAMPLE 2

EXPERIMENT NO. 5

The experimental procedure was substantially the same as in Example 1 except that the partially saponified PVA was replaced with another partially saponified PVA which had a degree of saponification of 80% by moles and an average degree of polymerization of 2640 to give a 1% by weight aqueous solution having a viscosity of 48.9 centipoise at 20° C. A 1% by weight aqueous solution thereof has an absorbance 0.08 of light at a wavelength of 280 nm for a 1 cm optical path length. The results of the evaluation tests undertaken for the resin product thus obtained are shown in the table.

COMPARATIVE EXAMPLE 3

EXPERIMENT NO. 6

The experimental procedure was substantially the same as in Example 1 except that the partially saponified PVA as the suspending agent in the form of an aqueous solution was introduced into the reactor concurrently with the deionized water pre-heated at 46° C. The results of the evalua-tion tests undertaken for the resin product thus obtained are shown in the table.

COMPARATIVE EXAMPLE 4

EXPERIMENT NO. 7

The experimental procedure was substantially the same as in Example 1 except that the temperature of the deionized water introduced into the reactor was 30° C. instead of 46° C. and the temperature thereof was not increased until start of the polymerization reaction. The results of the evaluation tests undertaken for the resin product thus obtained are shown in the table.

COMPARATIVE EXAMPLE 5

EXPERIMENT NO. 8

The experimental procedure was substantially the same as in Example 1 except that the amount of the aqueous solution of the partially saponified PVA was 2000 g instead of 600 g. The results of the evaluation tests undertaken for the resin product thus obtained are shown in the table.

TABLE

|  | Expt. No. | | | | | | | |
|---|---|---|---|---|---|---|---|---|
|  | 1 | 2 | 3 | 4 | 5 | 6 | 7 | 8 |
| Bulk density, g/cm$^3$ | 0.560 | 0.550 | 0.550 | 0.502 | 0.510 | 0.500 | 0.497 | 0.510 |
| Particle size distribution. | | | | | | | | |
| % fraction passed through screen of: | | | | | | | | |
| 60 meshes | 99.1 | 100 | 99.0 | 91.2 | 100 | 90.1 | 87.6 | 100 |
| 100 meshes | 21.3 | 35.6 | 19.6 | 43.5 | 53.1 | 60.9 | 70.5 | 69.8 |
| 200 meshes | 0.3 | 0.2 | 0.5 | 9.7* | 0.6 | 10.2* | 11.1* | 2.1 |
| DOP absorption, % | 23.9 | 24.2 | 23.5 | 25.3 | 18.7 | 26.2 | 25.9 | 24.7 |
| Fish-eyes, pieces | 1 | 1 | 3 | 10 | 120 | 21 | 31 | 1 |
| Residual monomer, ppm | 0.3 | 0.2 | 0.4 | 0.5 | 10.2 | 0.6 | 0.5 | 0.3 |
| Scale deposition | A | A | A | C | A | C | C | A |

*small amount of coarser particles contained

What is claimed is:
1. A method for the suspension polymerization of vinyl chloride monomer or a monomer mixture mainly composed of vinyl chloride in an aqueous medium which comprises the successive steps of:
   (a) introducing water to serve as the suspension medium into a polymerization reactor;
   (b) keeping the water in the polymerization reactor at a temperature of 40° C. or higher;
   (c) removing the air inside the polymerization reactor;
   (d) introducing the monomer or monomer mixture into the polymerization reactor under agitation to disperse the monomer or monomer mixture in the aqueous medium to form a polymerization mixture;
   (e) introducing a polyvinyl alcohol as the suspending agent in the form of an aqueous solution or dispersion into the dispersion of the monomer or monomer mixture under agitation; and
   (f) introducing a monomer-soluble polymerization initiator into the dispersion of the monomer or monomer mixture under agitation at a moment within 3 minutes from the introduction of the polyvinyl alcohol to start the polymerization reaction wherein the polymerization mixture is agitated with a power in the range from 0.8 to 2.0 kilowatts per cubic meter volume of the polymerization mixture.

2. The method for the suspension polymerization of vinyl chloride monomer or a monomer mixture mainly composed of vinyl chloride as claimed in claim 1 in which the temperature of water in step (b) is in he range from 40° to 50° C.

3. The method for the suspension polymerization of vinyl chloride monomer or a monomer mixture mainly composed of vinyl chloride as claimed in claim 1 in which the amount of water introduced into the polymerization reactor in step (a) is in the range from 100 to 200 parts by weight per 100 parts by weight of the vinyl chloride monomer or monomer mixture mainly composed of vinyl chloride introduced in step (d).

4. The method for the suspension polymerization of vinyl chloride monomer or a monomer mixture mainly composed of vinyl chloride as claimed in claim 1 in which the polyvinyl alcohol as the suspending agent is a partially saponified polyvinyl alcohol having a degree of saponification in the range from 60 to 80% by moles and an average degree of polymerization in the range from 500 to 1000 to give a 4% by weight aqueous solution having a visocity not exceeding 15 centipoise at 20° C. and gives a 1% by weight aqueous solution having an absorbance of light at a wavelength of 280 nm of at least 4 for an optical path length of 1 cm.

5. The method for the suspension polymerization of vinyl chloride monomer or a monomer mixture mainly composed of vinyl chloride as claimed in claim 1 in which the amount of the polyvinyl alcohol as the suspension agent is in the range from 0.02 to 0.08 part by weight per 100 parts by weight of the vinyl chloride monomer or monomer mixture mainly composed of vinyl chloride.

6. The method for the suspension polymerization of vinyl chloride monomer or a monomer mixture mainly composed of vinyl chloride as claimed in claim 1 in which the amount of the polymerization initiator is in the range from 0.03 to 0.20 part by weight per 100 parts by weight of the vinyl chloride monomer or monomer mixture mainly composed of vinyl chloride.

7. The method for the suspension polymerization of vinyl chloride monomer or a monomer mixture mainly composed of vinyl chloride as claimed in claim 1 in which the polymerization initiator is introduced into the polymerization mixture at a moment within a period from 30 seconds to 3 minutes after introduction of the suspending agent.

* * * * *